United States Patent
Deak et al.

(10) Patent No.: US 10,094,258 B2
(45) Date of Patent: Oct. 9, 2018

(54) METHOD FOR CONTROLLING AN EXTERNALLY EXCITED ELECTRIC MACHINE TO BOOST REGENERATION OF A NOX STORAGE CATALYST

(71) Applicants: Robert Bosch GmbH, Stuttgart (DE); SEG AUTOMOTIVE GERMANY GMBH

(72) Inventors: Istvan Deak, Ludwigsburg (DE); Bernd Schroeder, Renningen (DE); Martin Henger, Tamm (DE); Tobias Trzebiatowski, Gerlingen (DE); Benjamin Klein, Bietigheim-Bissingen (DE); Andreas Greis, Stuttgart (DE); Mario Kaepple, Oehringen (DE); Julian Roesner, Untergruppenbach (DE)

(73) Assignees: ROBERT BOSCH GMBH, Stuttgart (DE); SEG AUTOMOTIVE GERMANY GMBH, Stuttgart (DE)

( * ) Notice: Subject to any disclaimer, the term of this patent is extended or adjusted under 35 U.S.C. 154(b) by 280 days.

(21) Appl. No.: 15/154,551

(22) Filed: May 13, 2016

(65) Prior Publication Data
US 2016/0341087 A1    Nov. 24, 2016

(30) Foreign Application Priority Data

May 18, 2015    (DE) .......................... 10 2015 209 014

(51) Int. Cl.
*F01N 3/00* (2006.01)
*F01N 3/08* (2006.01)
(Continued)

(52) U.S. Cl.
CPC ........... *F01N 3/0814* (2013.01); *B60W 20/00* (2013.01); *F01N 3/0842* (2013.01);
(Continued)

(58) Field of Classification Search
CPC .... F01N 3/0814; F01N 3/0842; F01N 3/0871; F01N 9/00; F01N 2430/06;
(Continued)

(56) References Cited

U.S. PATENT DOCUMENTS

| | | | | |
|---|---|---|---|---|
| 28,899 A | * | 7/1976 | Himmelstein et al. | 173/12 |
| 5,966,931 A | * | 10/1999 | Yoshizaki | F01N 3/2026 60/284 |

(Continued)

FOREIGN PATENT DOCUMENTS

| | | |
|---|---|---|
| DE | 103 17 094 A1 | 11/2004 |
| DE | 103 38 871 A1 | 3/2005 |

(Continued)

*Primary Examiner* — Phutthiwat Wongwian
*Assistant Examiner* — Diem Tran
(74) *Attorney, Agent, or Firm* — Norton Rose Fulbright US LLP; Gerard Messina

(57) ABSTRACT

A method for controlling an externally excited electric machine to boost regeneration of a NOx storage catalyst which is part of an assembly made up of an internal combustion engine, the externally excited electric machine which is connected to the internal combustion engine in a manner allowing the transmission of torque and which has a rotor including a rotor winding and a stator, and the NOx storage catalyst which is disposed in an exhaust-system branch downstream of the internal combustion engine, the rotor winding of the electric machine being energized with a preexcitation current as a function of an operating state of the NOx storage catalyst.

12 Claims, 1 Drawing Sheet

(51) Int. Cl.
*F01N 9/00* (2006.01)
*B60W 20/00* (2016.01)
*F02D 41/02* (2006.01)
*F02N 11/04* (2006.01)

(52) U.S. Cl.
CPC .............. *F01N 3/0871* (2013.01); *F01N 9/00* (2013.01); *F02D 41/0275* (2013.01); *F01N 2430/00* (2013.01); *F01N 2430/06* (2013.01); *F02D 41/0245* (2013.01); *F02D 2041/026* (2013.01); *F02D 2250/24* (2013.01); *F02N 11/04* (2013.01); *Y02T 10/47* (2013.01)

(58) Field of Classification Search
CPC ............ F02D 2250/24; F02D 41/0245; F02D 41/0275; F02D 2041/026; B60W 20/00; Y02T 10/47
USPC .......................................... 60/285, 295, 297
See application file for complete search history.

(56) References Cited

U.S. PATENT DOCUMENTS

| | | | | |
|---|---|---|---|---|
| 6,991,052 B2 * | 1/2006 | Nogi | ...................... | B60K 6/445 123/348 |
| 7,458,203 B2 * | 12/2008 | Pott | .......................... | B60K 6/48 180/165 |
| 2007/0204594 A1 | 9/2007 | Ishiri | | |
| 2012/0259535 A1 * | 10/2012 | Jaros | ...................... | F02N 11/04 701/113 |

FOREIGN PATENT DOCUMENTS

| | | |
|---|---|---|
| DE | 10 2004 058 231 A1 | 7/2005 |
| DE | 10 2006 057 892 A1 | 6/2008 |
| DE | 10 2009 045 886 A1 | 4/2011 |

* cited by examiner

_US 10,094,258 B2_

METHOD FOR CONTROLLING AN EXTERNALLY EXCITED ELECTRIC MACHINE TO BOOST REGENERATION OF A NOX STORAGE CATALYST

CROSS REFERENCE

The present application claims the benefit under 35 U.S.C. § 119 of German Patent Application No. DE 102015209014.0 filed on May 18, 2015, which is expressly incorporated herein by reference in its entirety.

FIELD

The present invention relates to a method for controlling an externally excited electric machine to boost regeneration of a NOx storage catalyst, as well as an arithmetic logic unit and a computer program for its implementation.

BACKGROUND INFORMATION

To further reduce the fuel consumption of internal combustion engines, and therefore to further reduce the carbon-dioxide emissions, they may be operated with oxygen excess (lean operation mode). In doing so, however, other undesirable and harmful exhaust gases such as nitrogen oxides (NOx), for example, develop. In order to treat the exhaust gases, what are termed NOx storage catalysts may be used, in which the nitrogen oxides are stored. However, since they have only a finite storage capacity, they must be emptied, i.e., regenerated regularly (e.g., in the case of motor vehicles, about every few minutes). For this purpose, the internal combustion engine is operated with a rich mixture (i.e., air deficiency) in a manner richer than stoichiometric, so that the gases of the incomplete combustion (e.g., carbon monoxide (CO) and hydrocarbons (HC)) thereby resulting are available in the NOx storage catalyst for converting the released nitrogen oxides to nitrogen.

SUMMARY

According to the present invention, a method for controlling an externally excited electric machine to boost regeneration of a NOx storage catalyst, as well as an arithmetic logic unit and a computer program for its implementation are provided. Advantageous refinements are the present invention are described below.

The present invention provides an improved method for regenerating an NOx storage catalyst, in which interruptions in an ongoing regeneration of the NOx storage catalyst, which are caused by a shift of the operating point of the internal combustion engine toward lower loads, are able to be reduced or avoided completely.

As explained, in order to regenerate the NOx storage catalyst, it is necessary to operate the internal combustion engine with a rich mixture. For that, however, a certain minimum load must exist, e.g., as a result of high-speed travel. If the load is reduced, operation of the internal combustion engine with rich mixture may no longer be possible and the regeneration is broken off. This may lead to the exceedance of pollutant limit values.

In order to prevent this, an electric machine may be switched in to thus shift the operating point of the internal combustion engine toward higher loads again. The more electric energy generated by the electric machine, the more power the internal combustion engine must output. However, an electric machine is not put into operation abruptly.

Especially in the case of the externally excited electric machines usually used in motor vehicles, after the rotor has been energized, it takes relatively long (several 100 ms) until the desired excitation field is built up. This may potentially be too long to maintain the regeneration in the meantime, since it must usually be supplied with the proper gases again within 50 ms-200 ms. The present invention now employs the measure of energizing the rotor winding with a preexcitation current, that is, of preexciting it as a function of an operating state of the NOx storage catalyst. If a load is then actually called for by way of the electric machine, starting from the preexcitation current, the desired excitation field is able to be built up quickly and interruption of the regeneration may be avoided. Consequently, the desired torque may thus be achieved more rapidly. If the torque buildup proceeds fast enough, the time for the torque buildup may be left the same, resulting in a smaller torque gradient, and therefore less mechanical load of the components involved. The preexcitation permits a slower rise in torque, since the time which is otherwise needed for the excitation of the rotor winding is now available for the torque buildup (i.e., energizing of the stator winding). A slower rise in torque reduces overshoots in the drive train, especially in the area of accessory drives, and therefore the load of all components located therein like, for example, V-belt, belt tensioner, decoupler pulley, possibly overrunning pulley, crankshaft, dual-mass flywheel and ancillary components such as water pump, air-conditioning compressor, etc. Service life is increased.

Preferably, the preexcitation current amounts to less than 50%, e.g., approximately 30% of a maximum excitation current. In particular, the preexcitation current amounts to a few ampere, for example, less than 10 A, e.g., 1-4 A. Usually the pulse duty factor of a switch that is used for energizing the rotor winding and that switches the vehicle power supply to the rotor winding on and off is used as manipulated variable for the excitation current.

The electric machine is operated in torque-free fashion during the preexcitation. In particular, stator or phase windings are not energized during the preexcitation, or at the most, are energized in such a way that the electric machine picks off no torque from the internal combustion engine. Consequently, a loss of energy during the preexcitation may be held to a minimum and is limited generally to the power loss of the rotor winding. This is only a few watts. Since a regeneration is also already completed after a few seconds, this power loss is not noticeably in evidence in the overall energy balance.

In order to be able to react to a load reduction from the start, the preexcitation is expediently begun together with (especially simultaneously within the context of customary running and processing times) or shortly (e.g., a few ms, especially less than a rotor time constant) after the beginning of the regeneration of the NOx storage catalyst. In the same way, it is expediently ended again together with or shortly before the end of the regeneration of the NOx storage catalyst, in order to minimize the power loss.

The NOx storage-catalyst operating state, as a function of which the preexcitation is carried out, may be defined by the regeneration operation, that is, whether or not the internal combustion engine is being operated with a rich mixture for regenerating the NOx storage catalyst. Alternatively or additionally, it may also be defined by a load condition of the NOx storage catalyst, as described hereinafter.

According to one preferred specific embodiment, the preexcitation is carried out as a function of the load condition of the NOx storage catalyst as operating state. In particular, the rotor winding is only preexcited when the load condition of the NOx storage catalyst reaches at least a load threshold value. For instance, the load threshold value may be 50% or more, e.g., 70%.

This may happen depending on or independently of the regeneration, that is, the preexcitation may always be started upon reaching the load threshold value, or be started only together with or during the regeneration, when the load threshold value is reached. This further reduces the power loss. In the first case, expediently a somewhat higher load threshold value is selected, e.g., around 70%, whereas in the second case, a somewhat lower load threshold value is expediently selected, e.g., around 50%.

During the regeneration of the NOx storage catalyst, the electric machine preferably begins to operate in generator mode, particularly when a load reduction of a level takes place that leads to such a shift of the operating point of the internal combustion engine that the regeneration of the NOx storage catalyst would have to be cut short. For the generator mode of the electric machine, the excitation winding is supplied with a desired excitation current and a power converter downstream of the phase winding is controlled accordingly, i.e., usually in rectifying fashion. Consequently, the regeneration is able to be carried out completely and without interruption. The electrical energy is preferably stored in an electrical energy storage device of a vehicle electrical system such as a battery or an accumulator, for instance, and may then be used again later.

Preferably, a torque picked off by the electric machine is built up so quickly that the regeneration of the NOx storage catalyst does not have to be aborted. As explained before, this may take place as quickly as possible, that is, faster than without preexcitation, or it may take place as slowly as possible, that is, comparable to or just as fast as without preexcitation, but in a manner causing less damage to the materials.

In particular, the electric machine is a starter generator, (e.g., belt-driven starter generator, BSG) or the electric machine of a BRS (boost recuperation system) (also known as boost recuperation machine BRM). Starter generators (SG) are electric machines which may be operated in a vehicle as electric motor or as generator depending on the need. As generator, starter generators must be able to assume all tasks that are usually assigned to the generator, namely, the electrical supply of the vehicle electrical system and the charging of the vehicle battery. As electric motor, upon start of the internal combustion engine, starter generators must bring its crankshaft to the necessary starting RPM in a brief time. Given suitably great rated output, the electric machine in motor mode is able to support the internal combustion engine during driving, e.g., during acceleration in what is referred to as boost operation and for turbo lag compensation. During braking, a portion of the braking energy is able to be recuperated by a generator mode. Corresponding drives are known as hybrid drives, corresponding systems as boost recuperation systems (BRS).

An arithmetic logic unit according to the present invention, e.g., a control unit of a motor vehicle, is equipped, especially in terms of software, to carry out a method of the present invention.

The implementation of the method in the form of a computer program is also advantageous, since the costs entailed are particularly low, especially if an executing control unit is also used for further tasks and therefore is present in any case. Suitable data storage mediums for making the computer program available are, in particular, magnetic, optical and electrical memories such as hard disks, flash memories, EEPROMs, DVDs, etc. A program may also be downloaded via computer networks (internet, intranet, etc.).

Further advantages and refinements of the present invention are derived from the description below and the figures.

The present invention is represented schematically in the figures based on an exemplary embodiment and is described hereinafter with reference to the figures.

DETAILED DESCRIPTION OF EXAMPLE EMBODIMENTS

Figure 1:
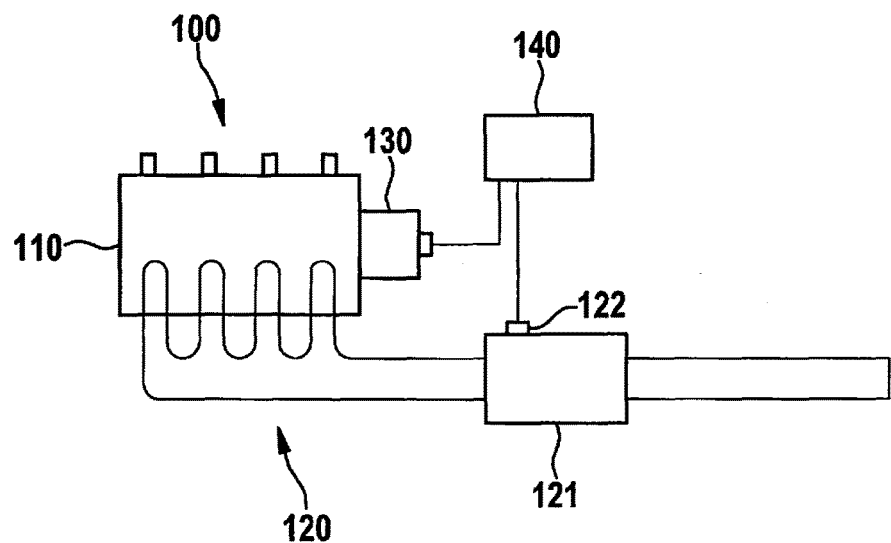
FIG. 1 shows schematically an assembly made up of an internal combustion engine, a NOx storage catalyst and an electric machine, as may form the basis for the present invention.

An assembly 100, as may form the basis for a preferred specific embodiment of the present invention, is shown schematically in FIG. 1. Assembly 100 has an internal combustion engine 110, e.g., a diesel or spark-ignition engine, whose exhaust gases are conducted into an exhaust-system branch 120. A NOx storage catalyst 121 is located in exhaust-system branch 120.

An electric machine in the form here of boost recuperation machine 130, or more precisely its rotor 131 (see FIG. 2) is connected to internal combustion engine 110, more precisely, to its crankshaft (not shown) in a manner allowing the transmission of torque. For example, the torque may be transmitted with the aid of a belt drive.

Figure 2:
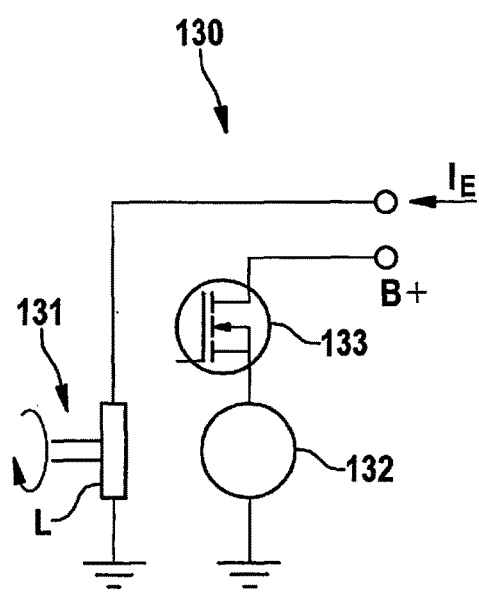
FIG. 2 shows, in the manner of a circuit diagram and in simplified fashion, an exemplary electric machine as may be used within the context of the present invention.

With reference to FIG. 2, which shows a rough schematic representation of the electric machine in an equivalent circuit diagram, the electric machine has rotor 131, a stator 132 and a power converter 133. Rotor 131 has a rotor winding L, and is mounted in a manner allowing rotation relative to the stator. To generate an excitation field, the rotor may be supplied with an excitation current $I_e$. If the electric machine is operated in generator mode, a voltage may be tapped off at a terminal B+.

In addition, assembly 100 has an arithmetic logic unit 140 equipped in terms of software to carry out a preferred specific embodiment of the invention. The arithmetic logic unit, or another arithmetic logic unit in data-transmitting connection with this arithmetic logic unit, is connected to a sensor 122 on NOx storage catalyst 121, which is used to measure the load condition of NOx storage catalyst 121 as a possible operating state, as a function of which, the preexcitation may be carried out. Arithmetic logic unit 140 is also in data-transmitting connection with electric machine 130 in order to control it.

Another possible operating state, as a function of which the preexcitation may be carried out, is the regeneration operation, that is, the internal combustion engine is operated with a rich mixture in order to regenerate the NOx storage catalyst.

At this point, several preferred combinations of the operating states indicated are possible. The preexcitation may always take place during a proceeding regeneration, or only when a specific load threshold is reached or exceeded at the same time. As a further alternative, the preexcitation may always take place when a specific load threshold is reached or exceeded, regardless of a proceeding regeneration.

According to one preferred specific embodiment of the present invention, rotor winding L of electric machine 130 in the example shown is energized with a preexcitation current during a proceeding regeneration of NOx storage catalyst 121, regardless of the load condition. During the preexcitation, the electric machine is operated in torque-free fashion, that is, the phase windings of stator 132 are not energized or, at the most, are energized in such a way that the electric machine does not pick off any torque from the internal combustion engine.

In case of a torque requirement, the preexcitation allows the excitation field to be generated quickly in rotor 131, so that a torque is able to be picked off just as quickly from the internal combustion engine. In the event of a drop in performance otherwise interrupting the regeneration, this makes it possible to maintain the regeneration. In an alternative specific embodiment, this allows a rise in torque with a smaller gradient, so that the components involved are protected.

What is claimed is:

1. A method for controlling an externally excited electric machine to boost regeneration of a NOx storage catalyst of an assembly made up of an internal combustion engine, the externally excited electric machine, being connected to the internal combustion engine in a manner allowing a transmission of torque and having a rotor including a rotor winding and a stator, and the NOx storage catalyst being disposed in an exhaust-system branch downstream of the internal combustion engine, the method comprising:
    energizing the rotor winding of the electric machine with a preexcitation current as a function of an operating state of the NOx storage catalyst;
    wherein the rotor winding is energized with the preexcitation current by applying to the rotor winding a current of between 1 and 4 A to operate the electric machine in a torque-free manner.

2. The method as recited in claim 1, wherein the energizing with the preexcitation current is carried out as a function of a load condition of the NOx storage catalyst as operating state.

3. The method as recited in claim 2, wherein the rotor winding of the electric machine is energized with the preexcitation current only when the load condition of the NOx storage catalyst reaches at least a load threshold value.

4. The method as recited in claim 3, wherein the rotor winding of the electric machine is energized with the preexcitation current only when the internal combustion engine is operated with a rich mixture in order to regenerate the NOx storage catalyst.

5. The method as recited in claim 3, wherein the rotor winding of the electric machine is energized with a preexcitation current while the internal combustion engine is being operated with a rich mixture to regenerate the NOx storage catalyst.

6. The method as recited in claim 5, wherein operation of the electric machine in generator mode is begun while the internal combustion engine is being operated with a rich mixture to regenerate the NOx storage catalyst.

7. The method as recited in claim 6, wherein a torque of the electric machine is built up so quickly that the regeneration of the NOx storage catalyst does not have to be broken off.

8. The method as recited in claim 6, wherein a torque of the electric machine is built up as quickly as possible.

9. The method as recited in claim 6, wherein a torque of the electric machine is built up as slowly as possible.

10. The method as recited in claim 1, wherein the rotor winding is energized with the preexcitation current by applying to the rotor winding the current of between 1 and 4 A so that phase windings of the stator are not energized.

11. An arithmetic logic unit which is equipped to carry out a method for controlling an externally excited electric machine to boost regeneration of a NOx storage catalyst of an assembly made up of an internal combustion engine, the externally excited electric machine, being connected to the internal combustion engine in a manner allowing a transmission of torque and having a rotor including a rotor winding and a stator, and the NOx storage catalyst being disposed in an exhaust-system branch downstream of the internal combustion engine, the arithmetic logic unit equipped to:
    energize the rotor winding of the electric machine with a preexcitation current as a function of an operating state of the NOx storage catalyst;
    wherein the rotor winding is energized with the preexcitation current by applying to the rotor winding a current of between 1 and 4 A to operate the electric machine in a torque-free manner.

12. A non-transitory machine-readable storage medium storing a computer program to control an externally excited electric machine to boost regeneration of a NOx storage catalyst of an assembly made up of an internal combustion engine, the externally excited electric machine, being connected to the internal combustion engine in a manner allowing a transmission of torque and having a rotor including a rotor winding and a stator, and the NOx storage catalyst being disposed in an exhaust-system branch downstream of the internal combustion engine, the computer program, when executed on a control unit, causing the control unit to:
    energize the rotor winding of the electric machine with a preexcitation current as a function of an operating state of the NOx storage catalyst;
    wherein the rotor winding is energized with the preexcitation current by applying to the rotor winding a current of between 1 and 4 A to operate the electric machine in a torque-free manner.

* * * * *